United States Patent [19]

Akiyama et al.

[11] 4,348,363
[45] Sep. 7, 1982

[54] APPARATUS FOR SOLID GAS REACTION

[75] Inventors: Toru Akiyama; Tsutomu Kamihigoshi, both of Takatsuki; Shoji Takagi, Toyonaka; Tadayuki Maeda, Settsu, all of Japan

[73] Assignee: Daikin Kogyo Co., Ltd., Osaka, Japan

[21] Appl. No.: 132,992

[22] Filed: Mar. 24, 1980

[30] Foreign Application Priority Data

Mar. 30, 1979 [JP] Japan ................................ 54-39193
May 31, 1979 [JP] Japan ................................ 54-74256

[51] Int. Cl.³ .......................... B01J 8/08; B01J 8/16; B01J 8/18
[52] U.S. Cl. .................................. 422/192; 366/112; 422/228; 422/233
[58] Field of Search ............... 422/232, 233, 198, 224, 422/228; 34/164, 181, 236; 366/111, 112; 148/12.9

[56] References Cited

U.S. PATENT DOCUMENTS 3,549,351 12/1970 Lundquist ..................... 422/233 X
3,707,355 12/1972 Anderson ......................... 422/233
3,871,829 3/1975 Keith et al. ..................... 422/233 X
3,929,920 12/1975 Komo et al. .

Primary Examiner—Bradley Garris
Attorney, Agent, or Firm—Armstrong, Nikaido, Marmelstein & Kubovcik

[57] ABSTRACT

Continuous fluorination of carbon is carried out by employing an apparatus for contact reaction of solid powder and reactive gas which comprises a horizontal reactor having a trough provided with weirs (e.g. height: 1 to 6 mm., interval: 5 to 30 cm.) and a vibrating means for vibrating the trough, and in which carbon particles supplied continuously are transported on the trough in a form of thin layer by the vibration of the trough while continuing the reaction by contacting efficiently the carbon particles with a fluorine gas. The contact reaction is efficiently conducted without accumulating the reaction heat to produce the fluorinated carbon in high yields, and the process is useful for the mass production. The apparatus is also useful for various contact reaction of a solid powder and a reactive gas.

6 Claims, 1 Drawing Figure

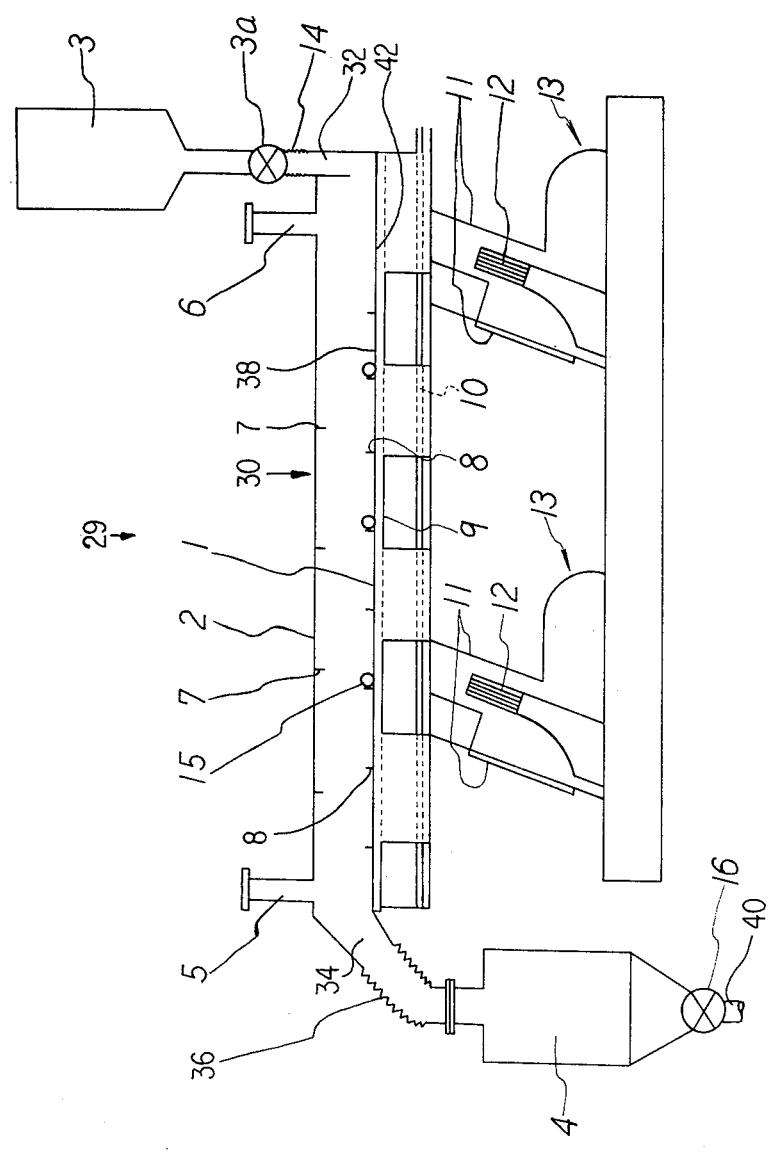

APPARATUS FOR SOLID GAS REACTION

BACKGROUND OF THE INVENTION

The present invention relates to a process for the continuous fluorination of carbon, and more particularly to a process for preparing a fluorinated carbon such as poly(carbonmonofluoride) or poly(dicarbonmonofluoride) by contact reaction of carbon with a fluorine gas. The present invention also relates to an apparatus for solid-gas reaction wherein the reaction of a solid and a gas is efficiently conducted without accumulating the reaction heat.

Recently, a fluorinated carbon has been watched as a new industrial material, and has been applied to various uses, for instance, as an active material for primary cells of high energy density, as a solid lubricant contained in liquid lubricants, greases and coating compositions, and as a fluorinating agent. Therefore, the demand for the fluorinated carbon has increased and a process for the preparation thereof suited for the mass production has been desired.

Hitherto, there have been adopted a batch process in which the reaction is carried out by passing a fluorine gas diluted with an inert gas through carbon particles placed in a reactor without any forced transference and the reaction product is taken out from the reactor after the completion of the reaction; and a continuous process in which the reaction is carried out by passing a fluorine gas diluted with an inert gas through carbon particles which are being transferred in a rotary kiln.

However, the batch process has the defect that the production capacity per bed area of a reactor is low and the production efficiency is bad. When the reactor is charged with a large quantity of carbon particles in order to raise the production efficiency, in other words, when the carbon particles are put on a bed of the reactor in a thick layer, the reaction heat is remarkably accumulated, since the thermal conductivities of the starting carbon particles and the produced fluorinated carbon are low and the reaction heat is not efficiently removed. Therefore, the thermal control is conducted with difficulty during the reaction, and as a result, degradation of the fluorinated carbon frequently takes place in the course of the reaction. When the carbon particles are put on the bed in a thin layer, much labor and time are required, thus lowering the production efficiency, though the accumulation of the reaction heat is avoided. Also, in the batch process, the contact efficiency is very inferior.

The continuous process using a rotary kiln can eliminate the problem of the batch process in taking the particles in and out. However, the heat efficiency is bad, and the heat removal is also bad because of an effective area of heat transfer being small. Moreover, uniform mixing of the particles is insufficient. The process also has the disadvantages that the reactor per a unit production amount is large and useless spaces are many, and the structure of the reactor is complicated.

SUMMARY OF THE INVENTION

It is an object of the present invention to provide a process for the continuous fluorination of carbon.

A further object of the invention is to provide a process for the continuous fluorination carbon suitable for the mass production.

Another object of the invention is to provide an apparatus for solid-gas reaction suitably employed for continuously fluorinating carbon particles.

These and other objects of the invention will become apparent from the description hereinafter.

It has now been found that the above-mentioned objects can be attained by continuously fluorinating carbon with a fluorine gas employing as a reactor a vibrating transportation apparatus having a trough provided with a plurality of weirs.

In accordance with the present invention, there is provided a process for the continuous fluorination of carbon in a horizontal reactor, said reactor having a trough provided with a plurality of weirs, carbon feed and exhaust ports in both end portions of the reactor and fluorine gas feed and exhaust ports in both end portions of the reactor, which comprises the steps of:

(a) introducing continuously a carbon onto the trough through a carbon feed port in one end portion of the reactor, (b) introducing a fluorine gas or a mixture of fluorine gas and diluent continuously into the reactor through a fluorine gas feed port in one end portion of the reactor, (c) bringing the carbon into contact with the gas to react them at a temperature of 200° to 600° C., while transporting said carbon on the trough in a stream of the gas with vibration, and (d) removing the fluorinated carbon continuously through a carbon exhaust port in another end portion of the reactor.

The present invention also provides an apparatus for contact reaction of a solid powder and a reactive gas, particularly suited for use in the continuous fluorination of carbon, which comprises (a) a horizontal reactor composed of a trough and a cover, said trough having a plurality of weirs at intervals on the upper surface, (b) a vibrating means for vibrating the trough, (c) feed and exhaust ports for a solid powder in both end portions of the reactor, and (d) feed and exhaust ports for a reactive gas in both end portions of the reactor.

BRIEF DESCRIPTION OF THE DRAWING

The single FIGURE is a schematic section view of an apparatus for contact reaction of a solid powder and a reactive gas showing an embodiment of the present invention.

DETAILED DESCRIPTION

In the process of the present invention, a vibrating transportation apparatus having a trough provided with weirs is employed as a reactor and the fluorination of carbon particles is carried out while transferring the particles in a form of thin layer with vibration, and thereby the following advantages are exhibited. Since the contact of carbon particles with a fluorine gas and the scattering of the reaction heat are effectively conducted and the reaction heat is sufficiently removed without accumulation, heat control in the reaction is easy. Also, since weirs are provided on the trough, the thickness of the particle layer on the trough and the transportation amount can be controlled, and also vortical mixing of the particles takes place before the weirs and it contributes to making the reaction conduct uniformly. The particles get over the weirs one after another and are glidingly transported on the trough, and uniformly fluorinated carbon particles can be continuously prepared without causing the lowering of the yield due to degradation. Further, the structure of the reactor is simple, and the reactor can be easily made small-sized or large-sized. It is also possible to easily control the transportation of the particles by changing the amplitude of vibration or the angle of inclination of the trough, and moreover abnormal reaction such as dust explosion due to vibration does not take place, since the transportation of the particles is smooth and there is no plying of the particles. Thus, the process of the present invention is very suitable for the mass production of fluorinated carbon, and is industrially very advantageous.

It is contrary to common sense to employ a vibrating transportation apparatus which has originally been developed for the purpose of mass transportation, as a reactor for the preparation of a fluorinated carbon which is slippery and is generally in the form of finely divided powder hard to transport. In fact, such a proposal has not yet been known. The present inventors have succeeded in development of a process for the continuous fluorination of carbon which can unexpectedly produce remarkable effects as mentioned above on the basis of the speciality of the present reaction, by providing weirs on a trough of a vibrating transportation apparatus.

When such a vibrating transportation apparatus having a trough provided with weirs is employed, reaction of a solid powder and a gas can be very efficiently conducted and the heat transfer can also be easily conducted. Therefore, the above-mentioned particular vibrating transportation apparatus is available for use in not only the continuous fluorination of carbon, but also a usual contact reaction of a solid powder and a reactive gas. For instance, the apparatus may be effectively employed in a chemical reaction of inorganic powders and halogen gases or other reactive gases, e.g. reaction of iodine and fluorine gas, reaction of alumina and hydrogen fluoride gas and reaction of cobalt fluoride and fluorine gas, and in a chemical reaction or surface treatment of polymer powders such as polytetrafluoroethylene, polyethylene and polystyrene with reactive gases such as fluorine gas. Thus, according to the present invention, there is provided an apparatus for contact reaction of a solid powder and a reactive gas which comprises a horizontal reactor composed of a trough and a cover therefor, the trough having a plurality of weirs at intervals on the upper surface, a vibrating means for vibrating the trough, and two pairs of feed and exhaust ports for the powder and the reactive gas provided in both end portions of the reactor.

The apparatus of the present invention is applicable to various solid powders such as inorganic materials and organic high polymers, and particularly to those having a particle size of not more than 50μ.

A rotary vibrator and an electromagnetic vibrator may be employed as the vibrating means, and are selected depending on the shape of the solid powder and the particle size. In general, when the particle size is small, an electromagnetic vibrator is preferred.

The apparatus may further include a heater for heating the reactor and a cooling means for keeping the vibrating means from superheating. Also, there may be attached to the inside of the cover for the trough a plurality of baffle boards projecting downward, and thereby the direction of the stream of a reactive gas is changed so that the reactive gas is sufficiently brought into contact with a solid powder on the trough.

The apparatus of the present invention shown generally at 29 will be explained with reference to the accompanying drawing which is a schematic sectional view showing a preferred embodiment of the invention. A reactor shown generally at 30 is formed by a trough 1 and a ceiling or cover 2 so as to be sealed. Hopper 3 is connected to rotary feeder 3a for feeding a solid powder to reactor 30, and they are located above cover 2. Rotary feeder 3a is connected to feed port 32 in the upper part of one end portion of reactor 30 through flexible hose 14. Vessel 4 for receiving the product is located at another end portion of reactor 30, and is connected to exhaust port 34 through a flexible hose 36. Feed port 5 for feeding a reactive gas is mounted in one end portion of cover 2, and exhaust port 6 for exhausting the gas is mounted in another end portion of the cover 2. Trough 1 is provided with a plurality of weirs 8 projecting upward from upper (inner) surface 38 of the bottom wall 42 of trough 1 at intervals, and weirs 8 may project upward with a slight gradient against the travelling direction of the powder. Cover 2 is provided with a plurality of baffle boards 7 at intervals to project downward into trough 1. Heater 9 for heating reactor 30 and a cooling means 10 for preventing the heating of vibrating means 13 are positioned outside and under trough 1. Vibrating means 13 for vibrating reactor 30 has electromagnets 12 which act as the vibration source, and the trough 1 supported by plate springs 11 is vibrated by electromagnets 12. The powder supplied from feeder 3a and heated by heater 9 is gradually transferred toward product vessel 4, while coming into contact, preferably counter current contact, with a reactive gas and continuing the reaction. The product in vessel 4 is recovered through rotary valve 16 and discharge line 40. Thermometer 15 is placed on the trough 1.

In case of vibrating means of a rotary vibrator type, the trough is vibrated by the exciting force of unbalanced weights attached to both ends of a rotor axis of a motor.

Weirs 8 are mounted on trough 1 at desired intervals, usually at intervals of 5 to 30 cm. The height of weirs 8 is from 1 to 6 mm., preferably 2 to 4 mm. When the height of weirs 8 is less than 1 mm., the layer of powder on the trough becomes too thin and it is necessary to make the area of the reactor large. On the other hand, when the height of the weir is more than 6 mm., transfer and uniform mixing of the powder become difficult and overheating may occur.

Trough 1 may be horizontal or it may be slightly inclined. The degree of inclination is selected from $-4°$ to $+4°$, preferably $+2°$ to $0°$, in which (+) means the inclination that the powder runs down, (−) means the inclination that the powder runs up and $0°$ means that the trough is horizontal. When the degree of inclination is more than $-4°$, the powder does not move forward, and when the degree of inclination is more than $+4°$, the powder slides on the trough in avalanche and the transportation control becomes difficult.

The contact reaction apparatus of the present invention has the following advantages.

1. A solid powder and reactive gas are effectively utilized and the production capacity per bed area is remarkably increased, since the vibrating trough having weirs is employed, and if desired, the baffle boards are attached to the cover, so that good contact of powder and reactive gas results, thereby permitting the process to be conducted in a continuous manner.

2. The powder moves smoothly on the trough. Also, thickness of the powder layer and the transportation of the powder are easily controlled by changing the height of the weirs, the amplitude of vibration of the trough or the angle of inclination of the trough.

3. Uniform contact and reaction take place, since the vortical mixing of the powder takes place before the weirs and the powder is sufficiently admixed.

4. Heat transfer is good, and heat control is easy. Heating of the powder and removal of the reaction heat are effectively conducted.

5. The reaction is conducted efficiently. When a reactive gas is caused to flow countercurrently through the reactor, the reaction efficiency is further increased, since fresh powder contacts lower concentration of reactive gas without causing rapid reaction and powder that has been partially reacted with the reactive gas is brought into contact with a higher concentration of the reactive gas.

6. The structure of the apparatus is simple, and the apparatus is easily made either in a small size or in a large size.

The process for the continuous fluorination of carbon of the present invention is practiced by employing the contact reaction apparatus as mentioned above. Since fluorine gas is very reactive, a nickel alloy such as Monel metal made by International Nickel Co. and nickel are preferred as the material of the reactor. The process of the present invention will be explained with reference to the accompanying drawing.

A carbon which is the starting material, in hopper 3 is supplied through the rotary feeder 3a into reactor 30, and is transported on the trough 1 in the direction of the product vessel 4. A fluorine gas is preferably caused to flow countercurrently to the carbon. The carbon on the trough 1 countercurrently contacts a fluorine gas supplied through fluorine gas feed port 5 to react therewith. When electromagnets 12 are excited by a pulsating current from a regulator of vibrating means 13, trough 1 is suddenly drawn downward by electromagnet 12. Since its speed is large, the carbon floats and falls forward onto trough 1 by the gravity. In the next instant, trough 1 is repelled forward and upward by the force of plate springs 11 so as to further move the carbon forward. At weirs 8 projecting upward from the bottom of trough 1, the carbon is mixed into a vortex and comes into contact with the fluorine gas, so the carbon slidingly, smoothly moves on the trough 1 while continuing the reaction. The reaction product is collected into vessel 4 through flexible hose 36. The fluorine gas supplied from feed port 5 is passed through reactor 30 and is exhausted from exhaust port 6. The fluorine gas passing through the reactor runs against baffle boards 7 projecting down from the cover 2, and its flow direction is changed so as to effectively contact the carbon in trough 1. A plurality of the apparatuses may be connected, as occasion demands, and the product obtained in the preceding apparatus may be further supplied to the next apparatus, when the apparatuses are connected in series.

The vibration may be conducted continuously or intermittently; during the reaction, the trough is always vibrated or vibration and stoppage of the trough is repeated. The vibrating transportation of a solid powder is desirably carried out under the following conditions. The number of vibrations of the trough is usually selected from 1,800 to 3,600 per minute. Within this range, the powder can be smoothly transported on the trough. The amplitude of vibration of the trough is selected from 0.1 to 1 mm., preferably 0.1 to 0.4 mm. When the amplitude of vibration falls within the above range, the powder smoothly moves with the appearance that as if it is stationary. When the amplitude of vibration is more than 1 mm., the powder frequently flies.

The carbon employed in the process of the present invention is not limited, and also may be either amorphous or crystalline carbon. For example, the carbon may be amorphous carbons such as carbon black, coke, petroleum coke, pitch coke and charcoal, and crystalline carbons such as natural graphite and artificial graphite. The carbon may be employed in various forms, for instance, in the form of powder, sphere, small blocks and small masses. In general, a finely divided powder having an average particle size of not more than $50\mu$ is preferred.

In the process of the present invention, a fluorine gas prepared by the electrolysis of a solution of $KF.2HF$ electrolyte may be employed. The fluorine gas so prepared may be employed as it is, or the gas from which impure hydrogen fluoride is removed may be employed. A commercially available fluorine gas charged in a bomb may also be employed in the process of the invention. A fluorine gas may be employed alone, but it is generally employed in the form of a mixture with a diluent for the purpose of the controlling the reaction because of high reactivity of fluorine gas. The fluorine gas is usually diluted with an inert gas such as nitrogen, argon, neon, helium, perfluorocarbons having 1 to 8 carbon atoms, air or carbon dioxide. The mixing ratio of the fluorine gas with the inert gas may vary depending on the reaction conditions such as the flow rate of the gas mixture and the reaction temperature. In general, the fluorine gas and the inert gas are mixed so that the partial pressure of the fluorine gas in the gas mixture falls within the range of 0.5 to 0.01, preferably 0.4 to 0.1. When the partial pressure of the fluorine gas is more than 0.5, the reaction rate becomes so large that the reaction heat is hard to be removed and by-products such as perfluorocarbons are increased. When the partial pressure is less than 0.01, the reaction rate becomes so slow that production efficiency is decreased.

The reaction temperature is selected from 200° to 600° C., preferably 200° to 500° C. Although the optimum reaction temperature generally varies within the above range depending on the kind of the carbon, the range of 200° to 450° C. is preferred for amorphous carbons and the range of 400° to 500° C. is preferred for crystalline carbons.

The degree of the fluorination may be suitably controlled according to the process of the present invention. Therefore, the process of the invention is also applicable to partial fluorination of carbon, especially to the fluorination of only the neighborhood of the surface of the carbon particles.

The process of the present invention is more particularly described and explained by means of the following Examples. These Examples are intended to illustrate the invention and not to be construed to limit the scope of the invention.

EXAMPLES 1 TO 6

Fluorination of carbon was carried out by employing a vibrating transportation type reactor as shown in the accompanying drawing, in which the sizes of the trough 1 were 10 cm. wide and 80 cm. long, the weirs 8 having a height of 10 cm. were attached onto the trough at intervals of 10 cm., the baffle boards 7 having a height of 2 cm. were attached to the cover 2 at intervals of 20 cm., panel heaters 9 were fixed to the under surface of the trough, and a jacket water cooler 10 was provided between the trough and the electromagnets 12 of the electromagnetic vibrators 13 (the number of vibrations: 60 Hz).

Petroleum coke carbon powder having a particle size of 1 to 38μ stored in the hopper 3 was continuously introduced into the reactor through the rotary feeder 3a. After the carbon powder was sufficiently preheated, the reaction was started under the conditions shown in Table 1 by continuously introducing a fluorine gas diluted with nitrogen from the feed port 5 to produce poly(carbonmonofluoride). The reaction product was collected in the vessel 4, and the yield and the fluorine content of the product were determined.

The results are shown in Table 1.

EXAMPLES 7 AND 8

The procedures of the preceding Examples were repeated except that a vibrating transportation type reactor having the trough of 10 cm. wide and 200 cm. long was employed.

The results are shown in Table 1.

EXAMPLE 9

Two hundred fifty grams of petroleum coke carbon powder having a particle size of 1 to 38μ were repeatedly subjected to the fluorination reaction in the same manner as in Example 1 except that the trough was intermittently vibrated (stoppage period of vibration: 5.5 minutes, vibration period: 0.5 minute) with the amplitude of vibration of 0.3 mm. and the reaction was conducted at 385° C.

The results are shown in Table 2, in which data on column 1, 2, 4, 6 or 8 of "Number of repetitions of reaction" are those obtained in the 1st, 2nd, 4th, 6th or 8th reaction, respectively.

TABLE 2

| Number of repetitions of reaction | 1 | 2 | 4 | 6 | 8 |
|---|---|---|---|---|---|
| Average transportation amount of powder (g./hr.) | 71 | 65 | 70 | 70 | 73 |
| Reaction time (hr.) | 4.5 | 5.5 | 6.5 | 7.0 | 7.0 |
| Fluorine content of product (wt. %) | 25.5 | 36.0 | 50.7 | 57.0 | 61.4 |
| Yield of product (g.) | 320 | 359 | 456 | 494 | 518 |

EXAMPLE 10

Two hundred fifty grams of petroleum coke carbon powder having a particle size of not more than 38μ were repeatedly subjected to the fluorination reaction in the same manner as in Example 1 except that the trough was intermittently vibrated (stoppage period of vibration: 5.5 minutes, vibration period: 0.5 minute) with the amplitude of vibration of 0.3 mm. and the reaction was conducted at 450° C. by passing a fluorine gas having a concentration of 10 vol. % at a flow rate of 3.8 liters/min.

The results are shown in Table 3, in which data on column 1, 2, 3 or 4 of "Number of repetitions of reaction" are those obtained in the 1st, 2nd, 3rd or 4th reaction, respectively.

TABLE 3

| Number of repetitions of reaction | 1 | 2 | 3 | 4 |
|---|---|---|---|---|
| Average transportation amount of powder (g./hr.) | 70 | 68 | 70 | 74 |
| Reaction time (hr.) | 4.5 | 5.5 | 6.5 | 7.0 |
| Fluorine content of product (wt. %) | 27.3 | 45.5 | 58.3 | 61.0 |
| Yield of product (g.) | 299 | 379 | 457 | 525 |

TABLE 1

| Example No. | 1 | 2 | 3 | 4 | 5 | 6 | 7 | 8 |
|---|---|---|---|---|---|---|---|---|
| Reaction temperature (°C.) | 400 | 460 | 495 | 460 | 460 | 460 | 450 | 450 |
| Degree of inclination of trough | +2° | +2° | +2° | +2° | +2° | +2° | +2° | +2° |
| Vibration condition of trough | | | | | | | | |
| Amplitude of vibration (mm.) | 0.2 | 0.3 | 0.2 | 0.4 | 0.2 | 0.2 | 0.1 | 0.2 |
| Continuous vibration | — | — | — | — | — | — | Con. | Con. |
| Intermittent vibration | | | | | | | | |
| Stoppage period (min.) | 6 | 12 | 6 | 7 | 6 | 3 | — | — |
| Vibrating period (min.) | 0.5 | 0.5 | 0.5 | 0.5 | 0.5 | 0.5 | — | — |
| Concentration of fluorine gas (vol. %) | 15.0 | 15.0 | 15.0 | 15.0 | 30.0 | 45.0 | 20.0 | 20.0 |
| Flow rate of fluorine gas (liter/min.) | 2.5 | 2.5 | 2.5 | 2.5 | 1.3 | 1.7 | 11.5 | 7.6 |
| Average reaction time (min.) | 120 | 120 | 120 | 60 | 120 | 60 | 30 | 22 |
| Reaction product | | | | | | | | |
| Yield (g./hr.) | 45 | 46 | 46 | 85 | 40 | 68 | 400 | 460 |
| Fluorine content (wt. %) | 40.0 | 58.2 | 61.5 | 35.0 | 61.5 | 61.6 | 48.0 | 27.8 |

What we claim is:

1. An apparatus for contact reaction of a solid powder and a reactive gas, said apparatus comprising:
    (a) a horizontal reactor having two end portions with a feed port for receiving a solid powder positioned in one end portion, a discharge port for discharging product positioned in the other end portion, a feed port for receiving reactive gas positioned in one end portion and a discharge port for discharging said gas positioned in the other end portion, said horizontal reactor comprising:
        (i) a trough comprising:
            (A) a bottom wall,
            (B) end walls, and
            (C) side walls, each wall having an inner surface and an outer surface, and
            (D) a cover having an inner surface and an outer surface;
        (ii) a plurality of weirs positioned at intervals on the inner surface of the bottom wall and projecting upward therefrom; and
        (iii) a plurality of baffle means positioned at intervals on the inner surface of the cover and projecting downward therefrom; and
    b) vibrating means for vibrating the trough.

2. The apparatus of claim 1, wherein the height of said weirs is from 1 to 6 mm.

3. The apparatus of claim 1, wherein said trough is provided with weirs at intervals of 5 to 30 cm.

4. The apparatus of claim 1, wherein said vibrating means is a rotary vibrator or an electromagnetic vibrator.

5. The apparatus of claim 1, further comprising a heating means for heating the reactor.

6. The apparatus of claim 1, further comprising a cooling means positioned between the trough and the vibrating means.

* * * * *